United States Patent [19]

Tabata

[11] Patent Number: 4,567,531

[45] Date of Patent: Jan. 28, 1986

[54] VERTICAL INTERVAL SIGNAL ENCODING UNDER SMPTE CONTROL

[75] Inventor: George K. Tabata, Wilmington, Calif.

[73] Assignee: Discovision Associates, Costa Mesa, Calif.

[21] Appl. No.: 401,587

[22] Filed: Jul. 26, 1982

[51] Int. Cl.[4] .............................................. H04N 5/92
[52] U.S. Cl. .................................... 358/335; 360/72.2; 360/33.1; 360/37.1; 360/14.1; 358/147; 369/32
[58] Field of Search ................... 360/72.2, 33.1, 37.1, 360/10.1, 14.1, 14.3, 14.2; 358/335, 214, 147, 346, 342; 369/32, 30

[56] References Cited

U.S. PATENT DOCUMENTS

| | | | |
|---|---|---|---|
| 4,115,819 | 9/1978 | Shigeta | 360/74.4 |
| 4,134,130 | 1/1979 | Tachi | 358/147 |
| 4,214,278 | 7/1980 | Hunt | 360/14.1 |
| 4,338,629 | 7/1982 | Oprandis | 360/72.2 |
| 4,402,018 | 8/1983 | Woda | 358/346 |
| 4,417,285 | 11/1983 | Mes | 360/10.1 |
| 4,460,927 | 7/1984 | Romeos | 358/346 |

FOREIGN PATENT DOCUMENTS 2809490 9/1978 Fed. Rep. of Germany ...... 358/342
2,376,486 7/1978 France .............................. 360/10.1

Primary Examiner—Alan Faber
Attorney, Agent, or Firm—Ronald J. Clark

[57] ABSTRACT

A method and means for vertical interval encoding of a program signal having at least a video program portion with sequential fields separated by vertical intervals, the program signal having associated therewith sequential field related identification code signals, wherein a desired field related identification code at which encoding of the program signal is to commence is selected. Continuously recurring vertical interval code signals are generated at predetermined intervals corresponding to like intervals between groups of fields, for example two or three, of the program signal. The identification code associated with the program signal is then compared with the selected identification code, and upon the occurrence of a match of identification codes, the composite video program signal is signal-mixed with the vertical interval code signal in timed relationship so as to insert the vertical interval code signal in corresponding vertical intervals of the program signal.

26 Claims, 9 Drawing Figures

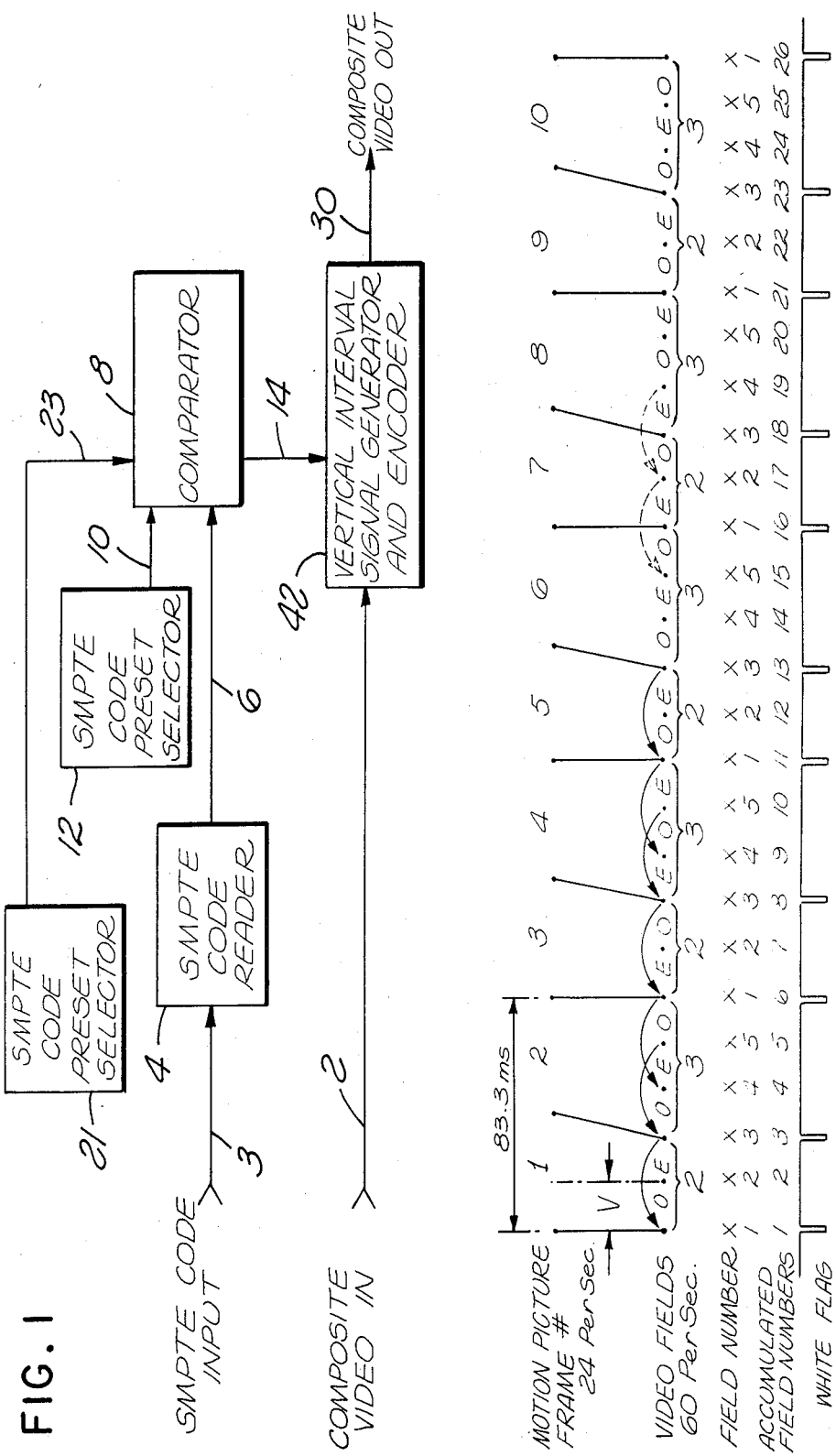

LEGEND
○ PROGRAM START
□ WHITE FLAG
⊠ PROGRAM END

VIDEO DISC WITH
3-2 PULLDOWN

LEGEND
o  PROGRAM START
▫  WHITE FLAG
⊠  PROGRAM END

VERTICAL INTERVAL SIGNAL ENCODING UNDER SMPTE CONTROL

BACKGROUND OF THE INVENTION

1. Field of the Invention

This invention relates to the field of video signal encoding, and in particular to a method and means for inserting code signals at certain line positions within the vertical interval of a video program signal.

2. Description of the Prior Art

Inserting code signals or words at designated line positions within the vertical interval of a standard video program signal is well known in the art. For example, U.S. Pat. No. 4,332,022, issued May 25, 1982 and assigned to the assignee of the present invention and entitled TRACKING SYSTEM AND METHOD FOR VIDEODISC PLAYER, shows and describes the manner in which stop motion is accomplished in a videodisc player by the recognition of a white flag occurring during the vertical interval of the program recorded on the videodisc. In such a system, upon detecting the presence of a white flag in the vertical interval, and having enabled the stop motion circuitry for performing retracing motions of the last-read information track, the optics of the videodisc player are driven to cause the read beam to retrace the last-read track. Upon again detecting the white flag, the player effects another retrace, and this process continues until another instruction is received by the player to cease the stop motion function.

Similarly, in a copending U.S. application No. 161,231 filed June 19, 1980, a divisional application of Ser. No. 066,620 now abandoned, filed Aug. 15, 1979 and assigned to the assignee of the present invention, entitled "VIDEO RECORDING MEDIUM FOR STOP-MOTION PLAYBACK", a stop-motion data flag is inserted during the vertical interval to indicate which frame contains compressed audio information.

In both of the aforementioned systems, insertion of the white flag or data flag signals is accomplished by routing the program signal through a summing amplifier, a second input to the summing amplifier being the white flag signal occurring in its proper time relationship to the program signal. The output of the summing amplifier is then the sum of the two signals, i.e., the program signal with the data flag inserted at the proper location in the vertical interval. If the data flag is to be inserted only on certain fields, for example only on odd fields or only on even fields, an operator must set the data flag generator to produce a flag at alternate field positions and manually synchronize the program signal with the data flag signal until the data flag is placed in the proper, or desired, even or odd numbered fields.

One problem associated with the prior art attempts at synchronizing a data flag signal with program material arises from the inability to begin or end placement of the vertical interval code at precise locations in the program material. That is, it is a relatively simple matter to combine a program signal and a vertical interval code signal in a summing amplifier for continuous summation of the two signals. However, it is often desirable in formatting videodiscs to identify, with frame accuracy, a lead-in portion by a particular code in the vertical interval, to identify active program material at a precise start point and end point, and to identify the beginning of a lead-out portion on the disc. Using the manual techniques described above, this was simply not possible. Furthermore, without the ability to precisely locate the vertical interval codes, proper placement was often found only by a trial and error method by which an operator would observe the location of the code signal in the vertical interval after the program material is started up, and if the code occurred at the wrong location, e.g., in an even field when it should have been in an odd field, a restart of the summing process was necessary.

A technique which offered improvement over the prior discussed manual method of inserting vertical interval codes in existing video program material, utilized the location and tracking principles involved in video editing. In such an arrangement, a video tape was prepared containing the program material, and a second video tape was prepared containing only the vertical code signals arranged in association with a composite sync signal produced by an appropriate signal generator. An operator would then load both tapes into corresponding tape players, and by operating the slow search controls of a video editing controller would locate the proper field (at the desired frame number) on the tape containing only sync and code information, would locate the proper field (at the desired frame number) on the program material tape, and perform an edit function. The two signals on the two tapes would then proceed in synchronization with one another for the length of the program, and a summing amplifier could then be used to sum the two signals together in a manner similar to that described with the manual operating procedure discussed earlier. By using the editing controller, at least the trial and error method was avoided, since the proper program field for insertion of the vertical interval code was chosen by the editing operator. Furthermore, the editing procedure assures that the vertical code signals will begin precisely and end precisely at desired points in the program. It can be appreciated, however, that such a procedure is extremely time consuming both in delay of processing and in accumulated operator labor hours. Additionally, this procedure ties up an expensive editing system for considerable time.

Accordingly, there is a need in the art for a system which can insert vertical interval code information into the appropriate vertical interval of a video program utilizing more automatic encoding techniques and avoiding the time comsuming and expensive editing procedures used in the past. The present invention provides such a system.

BRIEF DESCRIPTION OF THE INVENTION

The present invention overcomes the deficiencies of the prior art noted above by providing a method and means for vertical interval signal encoding of a composite video program signal under control of a field related identification code signal associated with the program signal.

More specifically the present invention provides a method and means for vertical interval encoding of a program signal having at least a video program portion with sequential fields separated by vertical intervals, the program signal having associated therewith sequential field related identification code signals. According to the invention, a desired field related identification code at which encoding of the program signal is to commence is selected. Continuously recurring vertical interval code signals are generated at predetermined intervals corresponding to like intervals between groups of fields, for example two or three, of the program signal. The identification code associated with the program signal is then compared with the selected identification code, and upon the occurrence of a match of identification codes, the composite video program signal is signal-mixed with the vertical interval code signal in timed relationship so as to insert the vertical interval code signal in corresponding vertical intervals of the program signal.

In a preferred embodiment, the field related identification code signals are SMPTE time code designations recurring at regular intervals. Generally, the SMPTE time code is contained on one of the audio channels of the program, and when the program is contained on a video tape, the SMPTE code data is generally contained on the cue track especially reserved for SMPTE code information. The code recorded on and retrieved from a video tape contains tens and units of hours, minutes, seconds, and frames. SMPTE time code information can also be inserted on the copy tape during film-to-tape transfer of a motion picture film to video tape. In such a case, the SMPTE number is updated on alternate fields, and due to the 24 frames per second rate of the motion picture as contrasted to the 30 frames per second rate of a standard video signal, a 3-2 pulldown transfer technique is employed to maintain picture synchronization in the transfer. The lack of correspondence between SMPTE time code numbers and picture frames in such a transfer will be dealt with later in this description.

The invention works equally well with film-to-tape transfers in which a SMPTE time code has not been inserted in the tape copy, or with tapes of camera originated material in which time codes were not inserted. In such a case, SMPTE time code striping on the cue channel of the master tape is required in order to prepare the tape for vertical interval encoding with the present invention. As will be explained later, in the event that time is of the essence, time code striping at the beginning of the program material for a minute of two is sufficient to fully synchronize the vertical encoding operation according to the present invention without the necessary of placing the SMPTE code along the entire length of the program. If desired, however, either continuous SMPTE coding can be recorded on the master tape, or a minute or so of SMPTE time code is placed at the end of the program to permit, respectively, either continuous verification of proper synchronization or end-check verification that the vertical interval code has been properly inserted for the entire length of the program.

As will be explained in detail later, one of the forms for the vertical interval code signal is a white flag inserted in a prescribed line position during recurring vertical intervals of the program signal to be recognized by a videodisc player as the point at which the tracking mirror should be kicked backward or forward one or more tracks in order to perform a stop-motion or variable motion speed operation.

Alternatively, the vertical interval code signal may be comprised of digital data inserted in a prescribed line position of the vertical interval to represent current program address information. For example, the digital data may represent frame number information or running time information for the program.

In even other examples of vertical interval code signalling, white flags or other types of recognizable data signals are inserted at one or more line positions in the vertical interval to identify that particular program portion containing such code information as lead-in or lead-out material. This would be important in an interactive video program where the active portion of the program must be separated from the lead-in and lead-out portions. For example, the active portion may contain instructional material for a student, while the lead-in and lead-out portions may contain material that the student need not see, inclusive of testing and alignment signals which only a technician would be interested in.

The apparatus for generating the continuously recurring vertical interval code signals comprises a modulo counter selectably settable between a modulo-2 configuration and a modulo-5 configuration, the vertical interval code signal being placed in a designated line position of alternate vertical intervals under the control of the generating apparatus when the counter is selectably set to a modulo-2 configuration, and the vertical interval code signal being placed in a designated line position of every first and third vertical intervals under control of the generating apparatus when the counter is selectably set to a modulo-5 configuration.

In this description, the field numbers in a 3-2 pulldown formatted video signal are referenced from the first field of the two-field part of a five-field sequence. That is, field number one is the first of the two-field sequence, and field number three is the first of the three-field sequence. The first field of the three-field sequence could have been designated field one. In such a case, the first field of the two-field sequence would be field number four. Thus, designating the first of a two-field sequence as field one is merely a matter of convenience for ease of discussing the invention.

In a similar manner, in this discussion, the vertical interval associated with each field is that vertical interval preceding the field. Thus, in a stop motion mode, a white flag in field one would cause a disc player to replay the previous two fields preceding field one of the designated frame. In a 3-2 pulldown format, this would mean the replay of fields four and five of the previous five-field sequence. Similarly, a white flag sensed in field three would cause a replay of fields one and two.

In view of the wide variety of applications for the present invention, a full discussion of the details for each conceivable application would not be practical in this description. Accordingly, while it can be recognized that the concepts of the invention would apply to transmitted television programs as well as recorded video programs on tape or disc, and to the placement in the vertical interval of a wide variety of code signals such as white flags, picture number information, chapter number information, lead-in and lead-out information, test signals, and the like, and although these various vertical codes can be represented by a wide variety of coding formats such as biphase, FM, multi-level, frequency bursts, and white flags, the exemplary description which follows concerns placing a white flag at a predetermined line position (preferably line 11) during the vertical interval of a program signal previously recorded on a video tape either from a video camera source or a motion picture source. From what has been discussed so far, it would be within the knowledge of the skilled worker to substitute other codes for a white flag and to treat other program signal sources in a manner similar to that to be described in connection with video taped program.

BRIEF DESCRIPTION OF THE DRAWINGS

The invention will now be described in detail having referenced to the accompanying drawings in which:

FIG. 1 shows the interconnection of the functional parts of the present invention in block diagram form;

FIG. 2 is a timing chart illustrating the relationship between video fields and picture frames of a motion picture film;

DETAILED DESCRIPTION OF THE PREFERRED EMBODIMENTS

Figure 3:
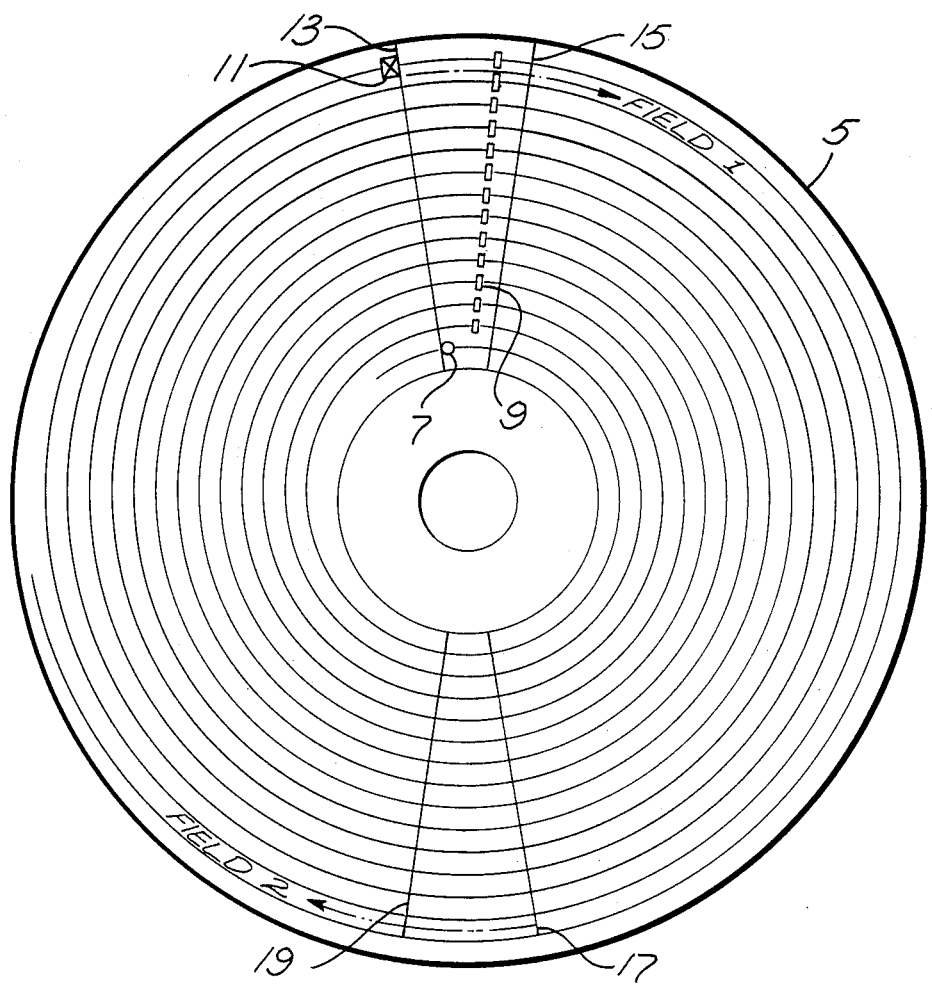
FIG. 3 shows a videodisc with exaggerated track spacing to illustrate the placement of white flags in a program recorded in a 2-2 pulldown format.

The basic concept of the present invention can be best understood by a reference to FIG. 1 which shows a functional arrangement of the invention in block diagram form.

Basically, since the invention relates to a method and means for inserting code signals at certain line positions within the vertical interval of a video program signal, in the following description, the overall system for vertical interval encoding will be referred to as a Command Encoder. The invention is designed to operate as a SMPTE time code controlled Command Encoder. It has the ability to generate a simulated 3-2 or 2-2 pulldown pulse for adding film pulldown pulses on a previously transferred film-to-tape. The SMPTE code determines the position of the pulldown pulses. In a preferred embodiment, the pulldown pulses are in the form of white flags inserted at line 11 in the appropriate vertical interval.

As seen in FIG. 1, composite video is inputted over line 2 to a vertical interval signal generator and encoder 42. Vertical interval code information on line 14 is mixed with the input composite video in block 42 and outputted as composite video output over line 30. Line 30 thus contains the input composite video with the vertical interval code inserted.

As mentioned earlier in this description, one of the major contributions to the art represented by the present invention concerns the automatic insertion of the vertical interval code at a selected frame, and the removal of the code at another selected frame if desired. Thus, vertical interval code information is inserted at precisely the desired locations in the video program with frame accuracy.

In this connection, a SMPTE code input over line 3 is retrieved from the video tape, i.e., from one of the audio channels or the cue channel, and decoded by SMPTE code reader 4. The numerical representation of the present position according to the SMPTE code is routed over line 6 to comparator 8. A second input to comparator 8 is a preselected SMPTE code over line 10 from SMPTE code preset selector 12. In a preferred embodiment, selector 12 is a thumbwheel switch which has rotational thumb-actuated discs representing tens and units of hours, minutes, seconds, and frames.

In operation, a video tape is loaded onto a tape player and placed in the play mode. The SMPTE code is retrieved from the tape and detected by reader 4. When the time code on line 6 is equal to the preset time code on line 10 from selector 12, comparator 8 outputs an enabling pulse on line 14 to enable and initiate generation of the desirable vertical interval code signal and to signal-mix that code signal with the composite video input over line 2. Once enabled, the vertical interval signal generator and encoder 42 continues to insert the code signal into the composite video for so long as it is enabled. When desired, a second selector 21 may comprise a second thumbwheel switch to send to the comparator a second preset SMPTE time code such that when a match is made with the present position SMPTE code on line 6, comparator 8 disables the signal generator and encoder 42, and the composite video output on line 30 becomes a replica of the composite video in signal on line 2.

Compounding the problem of accurately encoding the proper vertical interval (e.g., even or odd) is the frame rate disparity between motion picture film programs and video tape programs. As is common knowledge in the art, motion picture frame rate is 24 frames per second, while video program frame rate is 30 per second. In order to accommodate this frame rate discrepancy, a technique known as 3-2 pulldown is employed. FIG. 2 shows the relationship between a 24 per second motion picture frame rate and the 60 per second video field rate of a comparable video program.

Along the top of FIG. 2, ten equally spaced frames of a motion picture are schematically illustrated. Mathematical calculations will show that, at a 24 frame per second rate, two motion picture frames are spaced 83.3 ms apart. Similarly, at a 60 field per second rate for video, fields are spaced at 16.7 ms intervals (V=16.7 ms), so that 5 fields span a period of 83.3 ms. The calculations made in this description are approximate, since the concepts of the present invention can be described and understood without the necessity of specifying precise figures for such things as line frequency (15,734.264 Hz) and field frequency (59.94 Hz) according to NTSC color standards.

Video fields alternate between odd (O) and even (E) fields. FIG. 2 shows the grouping of odd and even fields within each five-field sequence comprising a two-field sequence part and a three-field sequence part. Since, as described earlier, a white flag, shown at the bottom of FIG. 2 precedes the associated field, in order to retrace two fields to make a complete video picture frame, it is necessary that a white flag be placed in field positions 1 and 3 of each five-field sequence. The arched arrows indicate permissible jumpback times for retracing a track on a videodisc in order to replay two consecutive fields that were produced from the same motion picture frame. To do otherwise would be to display on a video monitor one field taken from one motion picture frame and another field taken from a different motion picture frame. This nonacceptable jump-back function is illustrated in FIG. 2 by the broken arched arrows. As can be appreciated, any jumpback which spans a motion picture frame change would produce the aforementioned problem and is to be avoided. Accordingly, and assuming the first odd video field shown in FIG. 2 is field 1 of a five-field sequence, white flags must be placed in the video program preceding fields 1 and 3, or alternatively fields 3 and 5. In this manner, and assuming that the white flags are used by the player to effect stop motion or still framing action, every motion picture frame can be still framed in the video version of the program, provided that white flags appear at either field positions 1 and 3 or 3 and 5. What is to be avoided is a white flag occurring at field positions 2 and/or 4.

The videodisc shown in FIG. 3 is substantially to scale with the exception of the spiral track which is greatly exaggerated in pitch for ease of illustration. Since the videodisc is read from the inside to the outside, a prerecorded program starts at position 7 on the spiral track and may end at position 11. It should be noted that in the discussion which follows, a program can consist in any combination of sequential video signals inclusive of video black, lead-in, active portion, and lead-out. The term "program" as used in this description is not intended to convey the meaning of active program only.

Figure 4:
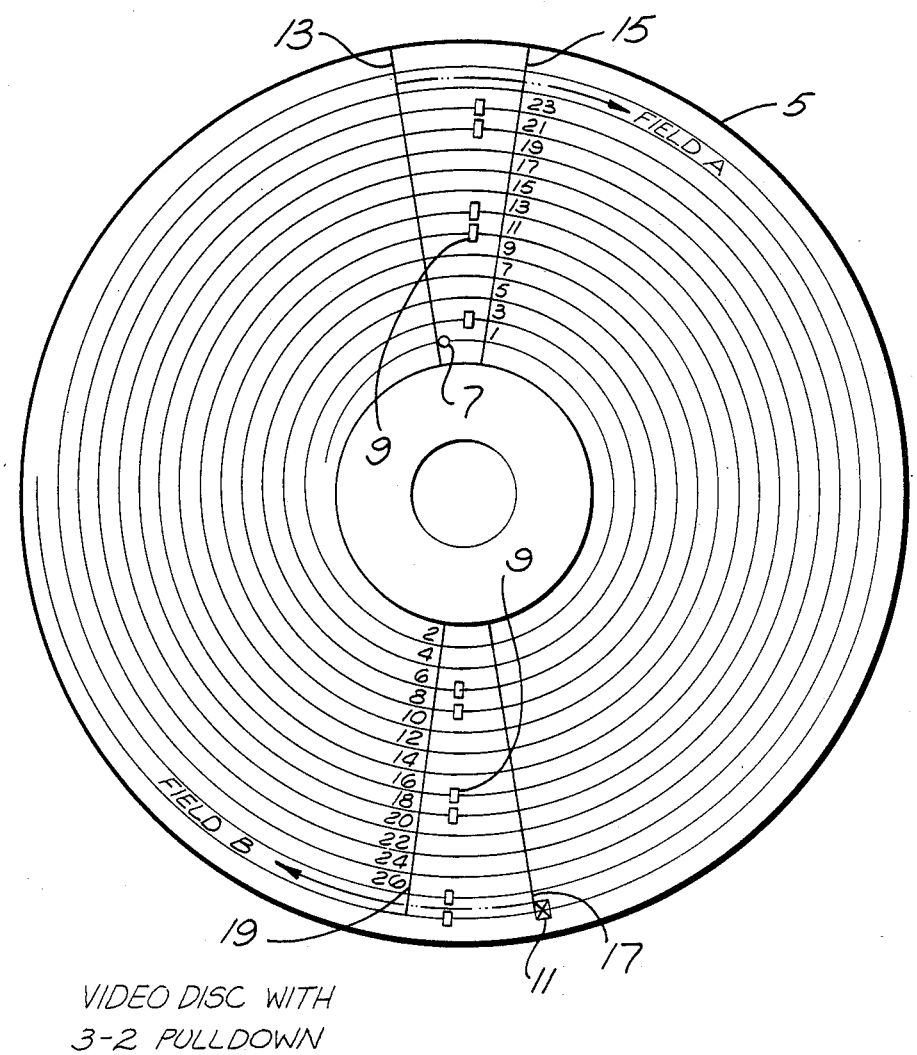
FIG. 4 shows a videodisc with exaggerated track spacing to illustrate the placement of white flags in a program recorded in a 3-2 pulldown format.

As seen in FIGS. 3 and 4, the beginning of each field is preceded by a vertical interval. For example, each field identified as "FIELD 1" begins at radial line 13 which represents the beginning of the vertical interval preceding the active video portion of the field which extends from radial line 15 (the end of the vertical interval) to radial line 17 (the beginning of the next vertical interval). In order to avoid interference between the vertical interval codes and vertical interval sync, the code signals are placed downstream of the vertical sync pulse, and as shown in FIGS. 3 and 4, the example of a white flag occurring at line position 11 is shown as elongated boxes 9. In FIG. 3, a white flag is placed on every track in alternate odd fields such that, by following the spiral clockwise around the disc from radial line 15, it can be seen that fields 1 and 2 are played in sequential order before a white flag occurs which may, for example, cause the reading light beam to jump-back one track and replay the two fields.

Referring back to FIG. 2, it can be appreciated that if a white flag were positioned on every odd field of a 3-2 pulldown formatted videodisc, stop motion jump-back would occur properly for three motion picture frames in a row and then improperly for two, properly for three, improperly for two, etc. By improper is meant that jump-back would cause a display on a video monitor of one motion picture frame for one of the fields comprising a video picture frame and an adjacent motion picture frame displayed as the companion field for the same video picture frame.

FIG. 4 and the bottom line of FIG. 2 illustrate one solution to the problem of still framing a video signal produced in a 3-2 pulldown from a motion picture film. In FIG. 4, rather than labelling the two identified fields as 1 and 2 (FIG. 3) they are labelled fields A and B. Beginning at program start 7, and following the spiral around the disc in a clockwise direction, it will be noted that a white flag is placed at the beginning of the third field from program start (A field), followed by the next white flag in the sixth field from program start (B field), and so on, white flags being inserted in the fields corresponding to the accumulated field numbers shown in FIG. 2 (i.e., fields 1, 3, 6, 8, 11, 13, etc.). In any event, the white flags positioned as shown in FIGS. 2 and 4 will ensure that stop motion, initiated at the sensing of a white flag, will display on the video monitor a complete video frame corresponding to a single motion picture film frame.

As with the 2-2 pulldown format, the problem still remains, using a 3-2 pulldown format, to encode the vertical interval with white flags at the proper line position and during the permissible vertical intervals to avoid picture jitter.

Figure 5:
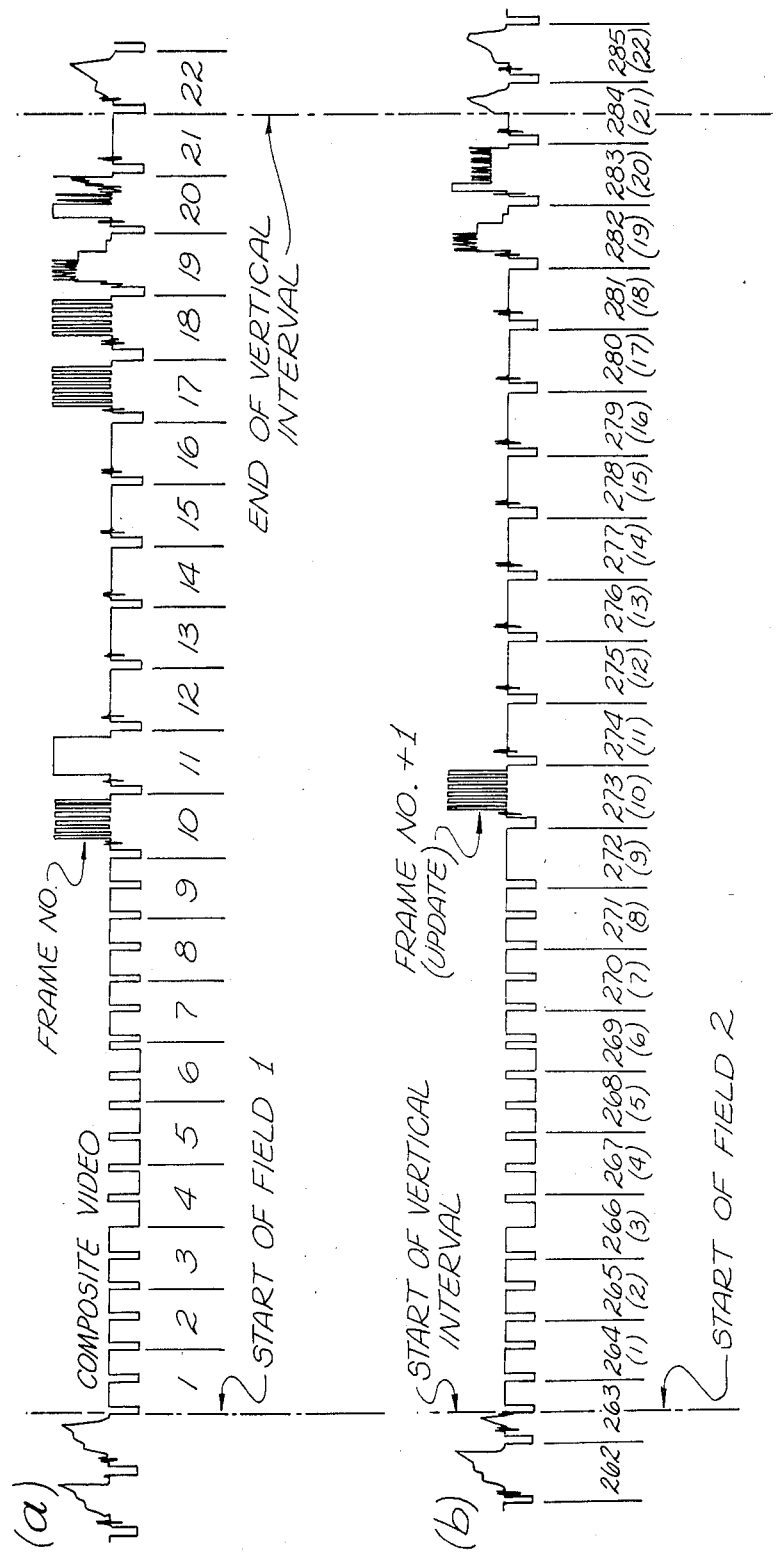
FIGS. 5(a) and (b) are charts showing the timing relationship between alternate fields of a composite video signal.

FIG. 5 shows a timing relationship between sequential vertical intervals consistent with the NTSC specifications for color video signals according to EIA RS-189 standard. In addition to the minimum requirements of the EIA standard, FIG. 5 shows certain vertical interval code signals at line positions 10, 11, and 17–20 of field 1, and at line position 273, 282, and 283 of field number 2. In a 2-2 pulldown format, the field shown in FIG. 5 (a) would be representative of all odd fields, while the field shown in FIG. 5 (b) would be representative of all even fields. In a 3-2 pulldown format, the same two field configurations would be seen in the two-field sequence and the first two fields of a three-field sequence. In the example shown in FIG. 2, the third field of a three-field sequence would have a vertical interval similar to that of FIG. 5 (b) and perhaps would even be devoid of any vertical interval code signals. Thus, the white flag is located only in line position 11, in the example of FIG. 2, in the first field of each new picture frame. As noted earlier, an alternate, and equally effective, encoding system places white flags in line position 11 during the vertical intervals of field numbers 3 and 5 of a five-field sequence, or in other words, the first and last fields of a three-field sequence.

Figure 6:
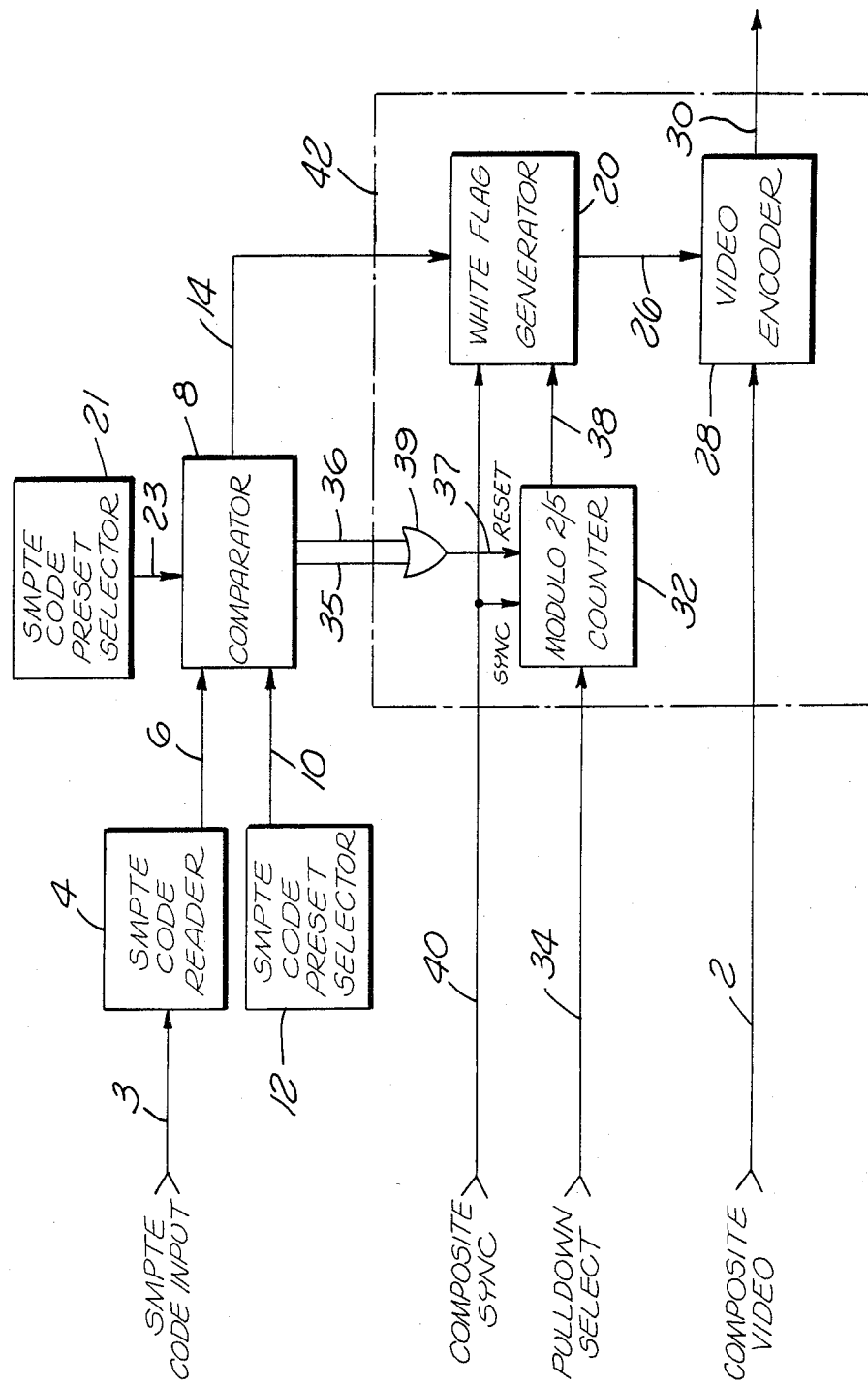
FIG. 6 is a more detailed diagram of the basic invention shown in FIG. 1, with the vertical interval signal generator and encoder component parts shown in greater detail.

FIG. 6 is a more detailed block diagram of that seen in FIG. 1 showing the vertical interval signal generator and encoder 42 in more detail. The operation of the SMPTE code preset selectors 12 and 21, SMPTE code reader 4, and comparator 8 are the same as described in connection with FIG. 1.

In the preferred example of FIG. 6, a modulo 2/5 counter 32 is employed. For effective operation, the counter 32 is reset automatically at predetermined times dependent upon the additional inputs from comparator 8 on lines 35 and 36 of FIG. 6. The function of these reset lines will be explained later.

When selector 12 has been preset to a prescribed SMPTE code for the start of vertical interval encoding, an output pulse from comparator 8 on line 14 is routed to white flag generator 20 which merely produces an all white signal during substantially the entire length of horizontal line position 11. Typically, specifications for the white flag are: amplitude 100 IRE, +0 IRE, −5 IRE; and width 0.790±0.020 H, or 50.2±1.3 microseconds. White flag generator 20 develops the white flag signal at precisely the line 11 (or 274) position under strict control of the composite sync signal on line 40 by any of a variety of known techniques. Placement of code signals at specific line positions is an old art, and the manner in which such signals are produced and their timing relationships need not be discussed in this description. For example, virtually every television broadcasting station inserts standard video test signals at specific line positions in their transmitted programs. FIG. 5 illustrates this by showing Vertical Interval Reference Signal (VIRS) on lines 19 and 282 per FCC recommendation 73-699. Similarly, a multiburst test signal is seen at line 20 and a composite test signal is seen at line 283, both in accordance with FCC recommendations. Line positions 10 and 273 of FIG. 5 contain frame number information in the form of a 40 bit FM code updated on the second field of each new picture frame. For disc compatibility, a 24 bit biphase coded (MANCHESTER-L) signal is inserted in lines 17 and 18 of the first vertical field. Both coding formats in lines 10 and 17 & 18 provide video field information, the former (line 10) providing picture frame number information on certain discs and program time information on others. Since timing and encoding techniques are clearly well developed in the art, it is presumed that the artisan has a multitude of references available to him for constructing white flag generator 20 and video encoder 28.

The heart of the invention lies in the modulo counter 32 and its association with the comparator 8 and white flag generator 20. The operation of the system of FIG. 6 will be described both with the counter 32 arranged as a modulo-2 counter and as a modulo-5 counter. Counter 32 is selectable between modulo 2 and modulo 5 functions by applying a logical "1" or a logical "0" on line 34 identified as the pulldown select input to the system. The modulo-2 configuration is used when white flags are to be inserted in alternate video fields, and this mode is employed when the video tape containing the program is formatted in a 2-2 pulldown configuration, as it would be when taken directly from a video camera. The modulo-5 arrangement of counter 32 is employed when the video tape contains a program transferred from motion picture film. Previously transposed film-totape may not have the 3-2 pulldown codes, and the Command Encoder of the present invention is employed in the process of placing the codes on the tape with the position based on the SMPTE codes. In either mode, modulo-2 or modulo-5, counter 32 is incremented by the vertical sync pulse extracted from the composite sync input on line 40. Thus, the count in counter 32 is field related, the counter in the modulo-2 mode acting as a toggle changing states at a field rate, and outputting counts spaced alternately two fields then three fields in the modulo-5 mode.

The modulo-5 counter 32 is provided with a reset pulse on line 37, the time of occurrence and recurrence thereof being determined by the selected position of the thumbwheel switch selector 12. This setting is compared against the SMPTE time code in comparator 8 to sync the modulo-5 counter in the proper count sequence to permit insertion of the vertical interval codes in the proper fields relative to the picture frames.

In the modulo-2 configuration of counter 32, white flag generator 20 is enabled by line 38 during the vertical interval of every other field. If desired, by known techniques, an operator may select which field, even or odd, gets the white flag. In any event, composite sync is required over line 40 to maintain the counter 32 in proper time relationship to the input composite video and SMPTE code input.

As can be appreciated by reference to FIG. 2, the modulo counter 32 must be reset and/or recycled at the beginning of each picture frame. Reset occurs when a match between the selected SMPTE code and the retrieved SMPTE code causes comparator 8 to output a pulse over line 36. The reset pulse so generated is applied to OR gate 39 and through gate 39 to a reset input of counter 32 over line 37. The reset pulse on line 36 occurs simultaneously with the enabling pulse on line 14 (also generated by a "match" in comparator 8) to initiate the action of the white flag generator. Accordingly, counter 32 will be reset simultaneously with the enabling of white flag generator 20 so that the first white flag will be inserted in proper timed relationship to the selected frame of the composite video in signal over line 2. Video encoder 28 is essentially a summing amplifier similar to that described earlier in connection with prior art devices.

After being reset, counter 32, still responsive to composite sync in, recycles and continues to output over line 38 a pulse utilized by white flag generator 20 to develop a white flag for encoding in the video signal. For so long as comparator 8 enables the generator 20 over line 14, i.e., for so long as the SMPTE input code exceeds the selected SMPTE code, a white flag will be generated for each counter pulse on line 38, and in the example presently being considered, a white flag will be generated for every other field.

The reset pulse on line 36 and the enabling pulse on line 14 are both single-occurrence pulses, i.e., they exist from the time the first comparison is made with selector 12 and continue until the second comparison is made with preset selector 21. Assuming that counter 32 was reset with line 36 routed through OR gate 39, and assuming that the composite sync input is stable and that the SMPTE comparison is reliably made, counter 32 will generate, continuously, a white flag for each count output on line 38. This results from the initial resetting of counter 32 at the proper time and the cycling of counter 32 due to the composite sync input. However, if desired, a second output from comparator 8 over line 35 can be sent through OR gate 39 to reset the counter 32. The reset pulse on line 35, in contrast to the long term pulse on line 36, occurs periodically. For example, if, in the 2-2 pulldown mode, white flags are to be inserted in alternate, generally odd fields, the least significant digit of the retrieved SMPTE time code can be routed through comparator 8 over line 35 to reset the counter on each new SMPTE number detected. As a result, counter 32 is reset by line 36 at the precise frame selected by selector 12 and is continuously reset thereafter on a periodic basis by the recurring reset pulses on line 35.

When encoding a composite video signal derived from a 3-2 pulldown picture frame to video field format, the same procedure is used for establishing the initial reset pulse on line 36 and 37 and the enabling pulse on line 14 for white flag generator 20. Accordingly, at the precise frame identified by the unique SMPTE time code selected in selector 12, white flag generator 20 will produce a white flag over line 26 triggered by the count from counter 32 over line 38, and the composite video leaving encoder 28 over line 30 will contain the input composite video signal inputted on line 2, together with the white flag generated from generator 20 on line 26.

Likewise, the recurring reset pulses on line 35 in the 3-2 pulldown mode is obtainable from the SMPTE time code input by decoding only a single least significant digit. For example, and having reference again to FIG. 2, it will be observed that a white flag occurs at like locations in the white flag signal pattern at accumulated fields having a least significant digit of one or six. For example, a white flag occurs at accumulated field numbers 1, 11, 21, 31, etc. By designing the modulo-5 counter to reset and cycle through five counts beginning at the first field of a five-field sequence, it is only necessary to detect the least significant digit "1" to keep the modulo counter 32 periodically reset. Again, if all is operating perfectly, it is only necessary to reset counter 32 with the one-time reset pulse on line 36. For safety sake, however, periodically resetting counter 32 is possible with a minimum amount of hardware as just described. More will be discussed along these lines in connection with the description of FIG. 9.

Figure 7:
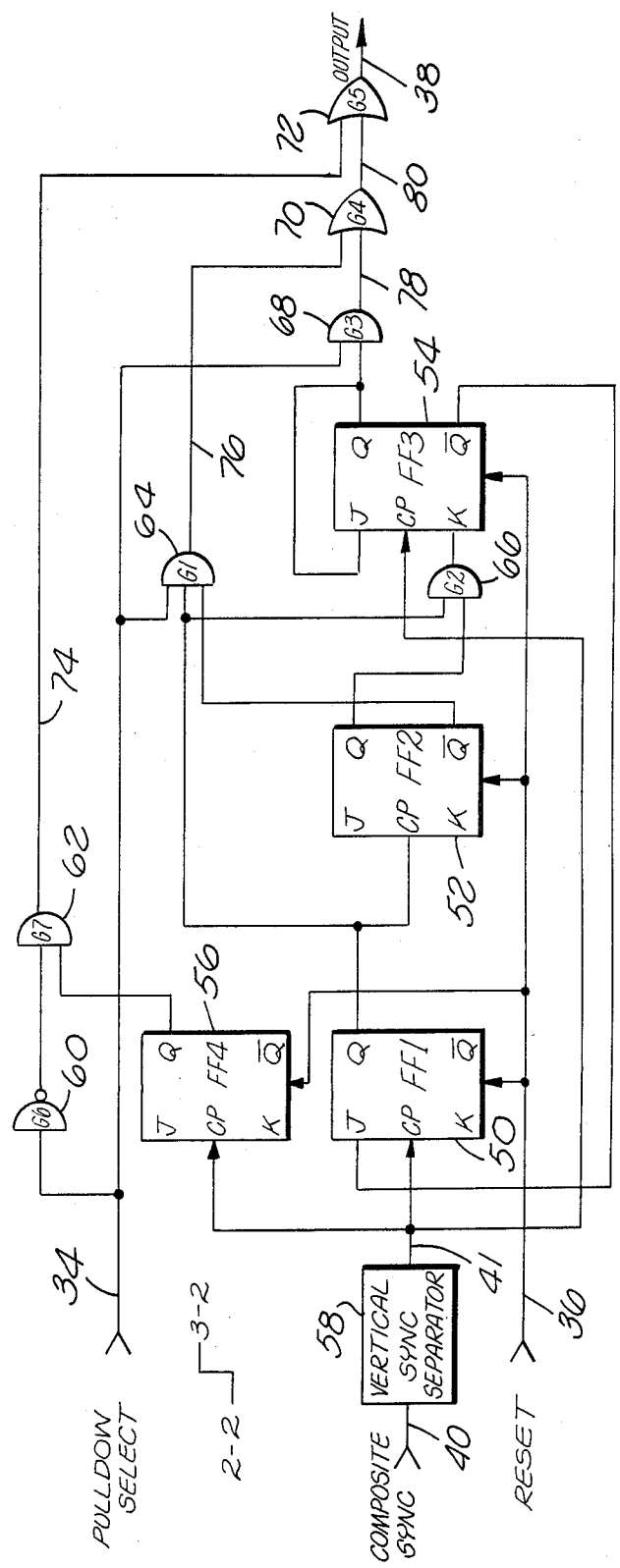
FIG. 7 is a sub-component illustrative configuration of the modulo 2/5 counter of FIG. 6.
Figure 8:
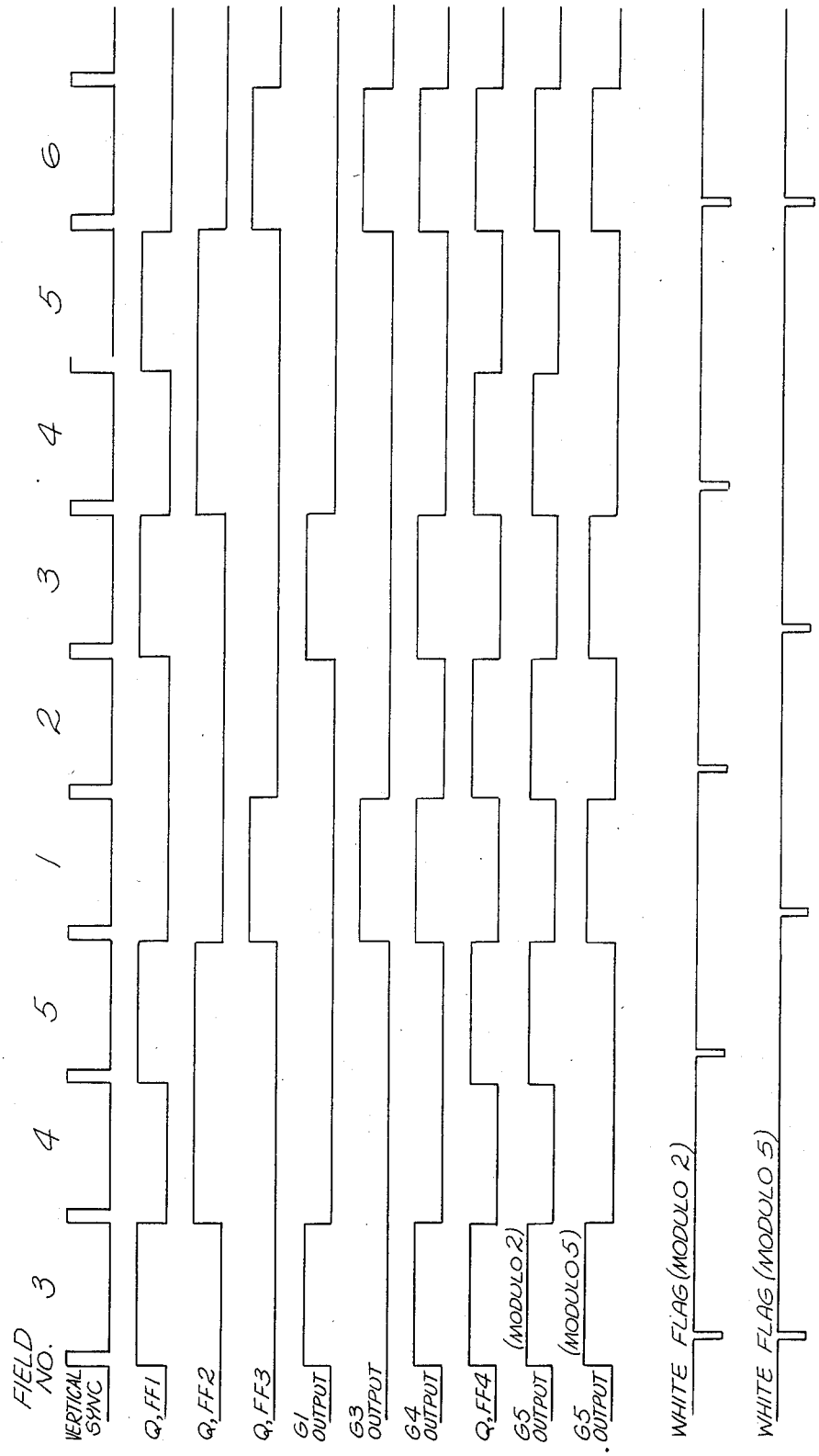
FIG. 8 is a timing chart showing the various waveforms associated with the block diagram of FIG. 7.

Turning now to FIG. 7, the detailed operation of counter 32 will be discussed. Since composite sync on line 40 contains both horizontal and vertical sync pulses, a vertical sync separator 58 is employed to reduce the input signal to repetitive vertical sync pulses to be used as a clock pulses for clocking flip-flops 50, 54, and 56. With the interconnection shown between flip-flops 50, 52, and 54, basic digital analysis will show that these three flip-flops are arranged in a modulo-5 counter arrangement characterized by the waveforms shown in the first four lines of FIG. 8. Flip-flop 56 is employed as the modulo-2 counter portion of the counter 32. Its Q output is shown in FIG. 8 as merely a divide by two waveform relative to the input vertical sync signal used as a clock. The pulldown select input 34 selects between the 2-2 pulldown mode and the 3-2 pulldown mode. When line 34 is low, gates 64 and 68 are disabled, and the only output from the system is from gate 62 which is enabled due to the inversion of the pulldown select signal by gate 60. The Q output of flip-flop 56 is thus routed through AND gate 62 and along line 74 through OR gate 72 and outputted on line 38 to perform the white flag generation function described earlier in connection with FIG. 6.

When pulldown select line 34 is in the logical 1 condition, the inversion of gate 60 inhibits gate 62 and prevents the modulo-2 output from occurring. However, gates 64 and 68 are enabled, and the Q outputs from flip-flops 50 and 54, together with the $\overline{Q}$ output of flip-flop 52 are gated through gates 64 and 68 according to the waveform chart of FIG. 8 to produce, through OR gate 70, the output identified in FIG. 8 as the modulo-5 output. As can be seen from FIG. 8, white flags are produced at horizontal line position 11 (shown in FIG. 8 to be slightly downstream of the occurrence of vertical sync), and the white flags occur in the timed relationship desired depending upon the output of gate 72 which, in turn, is dependent upon the operation of FIG. 7 as a modulo-2 or modulo-5 counter.

In the modulo-5 arrangement of FIG. 7, it is an additional requirement of the counter that, not only is a white flag to be generated on a recycling of five counts through counter 32 (for field 1), but also at the two count position of the modulo-5 counter (for field 3). As the waveforms of FIG. 8 indicate, the Q output of flip-flop 54 provides the proper time relationship to generate a white flag during field 1, and the output of gate 64, being the ANDed combination of the Q output from flip-flop 50 and the $\overline{Q}$ output from flip-flop 52, provides proper timing for a white flag at the field 3 position. Thus, by ANDing the signals in gate 64 and ORing the result on line 76 with the output of gate 68, proper time relationship for generating white flags in field positions 1 and 3 will have been accomplished. This is shown by the waveforms identified in FIG. 8 as G1 output, G3 output, and G4 output.

Independent of the modulo configuration selected, the reset pulse on line 36, generated in a manner described earlier, is effective to directly reset all of the flip-flops of the counter to begin counting anew on each reset pulse.

OR gate 72 is provided to output either the modulo-2 or the modified modulo-5 output dependent upon the pulldown select signal on line 34.

As opposed to using separate flip-flops and gates in the circuit of FIG. 7, larger scale integrated circuits are available to perform the modulo-2 and modulo-5 functions. For example, most of the circuitry of FIG. 7 can be replaced by a single chip such as the Texas Instruments SN 54176 or SN 54196 or Motorola SN 54LS 290.

Figure 9:
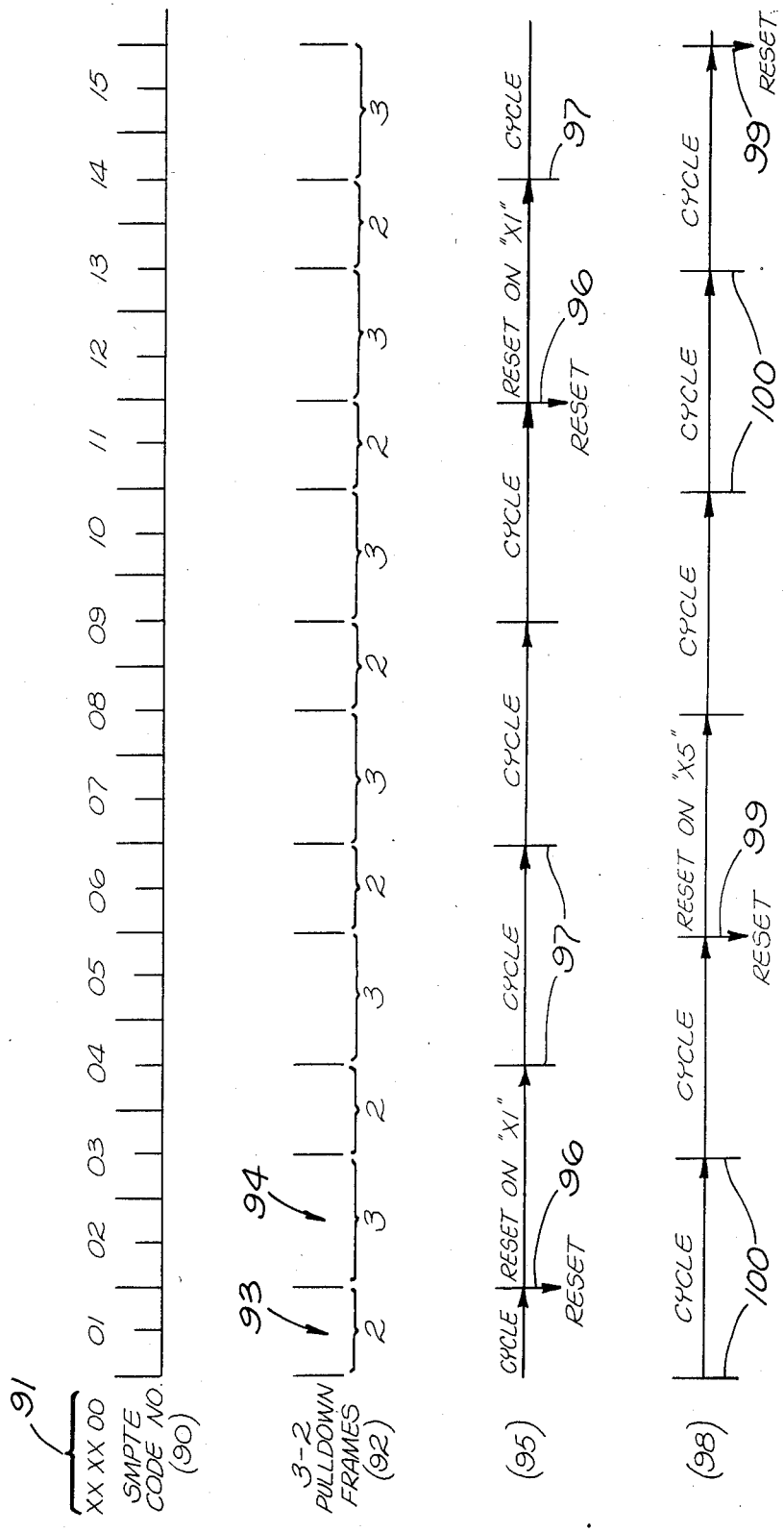
FIG. 9 is a timing chart showing the relationship between SMPTE code number and the reset operation of the modulo counter functional block of FIGS. 6 and 7.

FIG. 9 is a diagram similar to that of FIG. 2 but with the SMPTE code number 91 being used as a reference. At line 90 in FIG. 9, the SMPTE code number XX XX 00 is used as a reference, and the next fifteen SMPTE code numbers are displayed in sequence. Since each SMPTE code number identifies a complete video frame or two fields, the shorter vertical lines in line 90 indicate vertical intervals occurring between the alternate vertical intervals defining the picture boundaries.

In operation, the SMPTE time code numbers on the audio or cue track of the tape recorder are deposited sequentially with each number occupying two consecutive fields. Accordingly, in a 3-2 pulldown situation, there is no correspondence between video frame SMPTE code numbers and motion picture frame numbers. Line 92 of FIG. 9 shows this by spanning a two-field sequence across SMPTE code number 01 and the next three-field sequence across SMPTE code number 02 and the first half of code number 03. The alternate 2, 3, 2, 3 arrangement of fields is laid out for the first fifteen SMPTE code numbers illustrated.

Counter 32 when periodically reset over line 35 (FIG. 6) requires, in a preferred embodiment, a reset pulse to occur at the beginning of each five-field sequence, the beginning of which is defined in this specification arbitrarily by the first-field of a two-field sequence 93 as seen in FIG. 9. By utilizing the simplified periodical reset approach described earlier, it is only necessary to provide a reset pulse, let the modulo counter cycle through on its own for a few cycles and then reset again. This can be seen in the representation of line 98 in FIG. 9 where a reset is effected on the recognition of a SMPTE time code ending with the least significant digit "5". Since SMPTE time codes are verified at the end of a picture frame that each code represents, the recognition of "X5" (i.e., 05, 15, 25, etc.) will cause a reset shown by arrow 99. The modulo-5 counter will then cycle through on its own for a number of cycles 100 until the next "X5" digit is detected in the SMPTE code being read. This occurs again at 99 to the right of line 98 in FIG. 9.

As previously mentioned, it is equally suitable to reset the counter at the beginning of the three-field sequence provided that appropriate circuit changes in the counter arrangement of FIG. 7 are made. Line 95 of FIG. 9 merely illustrates that possibility by causing a reset at 96 when the SMPTE time code reads "X1" (i.e., 01, 11, 21, 31, etc.). The next three cycles of the modulo-5 counter is self-clocking, until the next reset 96 occurs at the recognition of the next "X1" digit.

Of course, theoretically the occasional reset pulse on line 35 is not needed, but the stability and reliability of the system are improved when considering that some of the signals upon which the operation of the invention depends is taken from video tape, and errors can be generated by noisy electromechanical devices, both externally and within the tape transport, as well as tape dropout conditions.

In this connection, while good quality control procedures might demand continuous resetting of the modulo counter, in the interest of time and economy, once the proper SMPTE time code has been identified for resetting and initiating cycling of the modulo counter, the self-clocking feature of the counter should provide proper timing for the white flag throughout the entire length of the program. Accordingly, only a few seconds or perhaps minutes of SMPTE time code need be deposited on the master tape at the beginning of the program material. If verification that all has been well during the white flag encoding process, a few seconds or minutes of SMPTE time code could also be added to the end of the program material.

In any case, whether the SMPTE time code is put on at the beginning only, continuously throughout the program, or at the beginning and end, an operator must initially select the frame number by SMPTE code identification at which white flag insertion is to take place. The frame number so selected can then be entered into the system by the thumbwheel switch selector 12. In the verification procedure alluded to above, the operator can fast forward the tape to a point near the end of the program and again choose a specific SMPTE time code to be deposited beginning at a specified picture frame in order that the recurring modulo-5 count pulses will be in proper registration between the beginning and the end of the program on the tape.

The objectives set forth in the beginning of this description are met by the method and apparatus described in detail with reference to the accompanying drawings. That is, a reliable and exacting system has been defined which deposits white flags, or other vertical interval code signals, automatically at a preselected beginning point, terminates the encoding at a preselected end point, and maintains synchronization of the white flag encoding throughout the length of the program. Furthermore, although the invention has been described in detail with reference to its presently preferred embodiments, it will be understood by one of ordinary skill in the art that various modifications can be made without departing from the spirit and scope of the invention. For example, by incorporating more sophisticated SMPTE time code detection and gating techniques, the modulo counter 32 can be automatically changed between a modulo-2 and modulo-5 configuration by the detection that the input composite video signal has shifted from a 2-2 pulldown format to a 3-2 pulldown format, and vice versa. This would be especially useful when a video taped program is a composite of video camera source material and motion picture film source material. Accordingly, it is not intended that the invention be limited except as by the appended claims.

I claim:

1. A method for vertical interval signal encoding of a composite video program signal having at least a video program portion with sequential fields separated by vertical intervals, said program signal having associated therewith sequential field related identification code signals, said method comprising the steps of:
   generating a desired field related identification code at which encoding of said composite video program signal is to commence;
   generating continuously recurring vertical interval code signals, signal-compatible with said program signal and synchronous therewith, at predetermined intervals corresponding to like intervals between groups of fields of said program signal;
   comparing said field related identification code signals associated with said program signal with the selected desired field related identification code; and
   upon the occurence of a match of identification codes in said comparing step, signal-mixing said composite video program signal and said vertical interval code signals in timed relationship so as to insert said vertical interval code signals in time corresponding vertical intervals of said program signal.

2. The method as claimed in claim 1, wherein said vertical interval code signal is a white flag inserted in a prescribed line position of said time corresponding vertical intervals of said program signal.

3. The method as claimed in claim 2, wherein said recurring vertical intervals are those occurring alternately in a 2-2 pulldown program signal format.

4. The method as claimed in claim 3, wherein said recurring vertical intervals are those occurring as alternate even vertical intervals.

5. The method as claimed in claim 3, wherein said recurring vertical intervals are those occurring as alternate odd vertical intervals.

6. The method as claimed in claim 2, wherein:
   groups of at least two of said sequential fields define sequential picture frames of said program signals; and
   said recurring vertical intervals are those associated with the first video field of each new picture frame.

7. The method as claimed in claim 2, wherein said recurring vertical intervals are those occurring at the beginning of fields other than fields two and four of a five field sequence of a 3-2 pulldown program signal format.

8. The method as claimed in claim 7, wherein said recurring vertical intervals are those occurring at field positions one and three in a 3-2 pulldown program signal format.

9. The method as claimed in claim 7, wherein said composite video program signal is derived from a motion picture film medium, and said method includes the step of recording a SMPTE time code on a recording track of a video tape while performing a film-to-tape transfer of the program.

10. The method as claimed in claim 1, wherein said vertical interval code signal is digital data inserted in a prescribed line position during recurring vertical intervals of the program material, said digital data representing current program address information.

11. The method as claimed in claim 1, wherein said field related identification code signals are SMPTE code designations individually identifying the first field of each new sequential picture frame of said program signal.

12. The method as claimed in claim 1, wherein said field related identification code signals are SMPTE code designations recurring at every second field of said program signal.

13. The method as claimed in claim 1, including the step of recording said composite video program signal onto a recording medium, and said vertical interval code signals identify lead-in and lead-out portions of the program signal before and after, respectively, a recorded main program segment.

14. Apparatus for vertical interval signal encoding of a composite video program signal housing at least a video program portion with sequential fields separated by vertical intervals, said program signal having associated therewith sequential field related identification code signals, said apparatus comprising:

means for generating a desired field related identification code at which encoding of said composite video program signal is to commence;

means for generating continuously recurring vertical interval code signals, signal compatible with said program signal and synchronous therewith, at predetermined intervals corresponding to like intervals between picture frames of said program signal;

a comparator for comparing said field related identification code signals associated with said program signal with the selected defired field related identification code; and means for signal-mixing, upon the occurrence of a match of identification codes, said composite video program signal and said vertical interval code signals in timed relationship so as to insert said vertical interval code signals in time corresponding vertical intervals of said program signal.

15. The apparatus as claimed in claim 14, wherein said vertical interval code signal is defined by a white flag placed in a prescribed line position of said time corresponding vertical intervals of said program signal.

16. The apparatus as claimed in claim 15, wherein said recurring vertical intervals are those occurring alternately in a 2-2 pulldown program signal format.

17. The apparatus as claimed in claim 16, wherein said recurring vertical intervals are those occurring as alternate even vertical intervals.

18. The apparatus as claimed in claim 17, wherein said white flag is inserted by said means for signal-mixing in line position 11 of the first video field of each new picture frame.

19. The apparatus as claimed in claim 16, wherein said recurring vertical intervals are those occurring as alternate odd vertical intervals.

20. The apparatus as claimed in claim 15, wherein:
    groups of at least two of said sequential fields define sequential picture frames of said program signal; and
    said recurring vertical intervals are those associated with the first video field of each new picture frame.

21. The apparatus as claimed in claim 15, wherein said vertical interval code signal is digital data inserted in a prescribed line position during recurring vertical intervals of the program material, said digital data representing current program address information.

22. The apparatus as claimed in claim 15, wherein said recurring vertical intervals are those occurring at field positions other than field positions two and four of a five field sequence in a 3-2 pulldown program signal format.

23. The apparatus as claimed in claim 22, wherein said recurring vertical intervals are those occurring at field positions one and three in a 3-2 pulldown program signal format.

24. The apparatus as claimed in claim 14, wherein said field related identification code signals are SMPTE code designations individually identifying each new sequential picture frame of said program signal.

25. A method for vertical interval signal encoding of a composite video program signal recorded on a recording medium and having at least a video program portion with sequential fields separated by vertical intervals, said method comprising the steps of:

depositing on said recording medium sequential identification code signals field related to, and in synchronization with, said program sequential fields;

selecting a desired field related identification code at which encoding of said composite video program signal is to commence;

generating continuously recurring vertical interval code signals, signal-compatible with said program signal, at predetermined intervals corresponding to like intervals between groups of fields of said program signal;

comparing said field related identification code signals associated with said program signal with the selected desired field related identification code; and upon the occurrence of a match of identification codes in said comparing step, signal-mixing said composite video program signal and said vertical interval code signals in timed relationship so as to insert said vertical interval code signals in corresponding vertical intervals of said program signal.

26. Apparatus for vertical interval signal encoding of a composite video program signal housing at least a video program portion with sequential fields separated by vertical intervals, said program signal having associated therewith sequential field related identification code signals, said apparatus comprising:

means for generating a desired field related identification code at which encoding of said composite video program signal is to commence;

means for generating continuously recurring vertical interval code signals, signal compatible with said program signal and synchronous therewith, at predetermined intervals corresponding to like intervals between picture frame of said program signal;

a comparator for comparing said field related identification code signals associated with said program signal with the selected desired field related identification code; and means for signal-mixing, upon the occurrence of a match of identification codes, said composute video program signal and said vertical interval code signals in timed relationship so as to insert said vertical interval code signal in time corresponding vertical intervals of said program signal, and wherein:

said vertical interval code signal is defined by a white flag placed in a prescribed line position of said time corresponding vertical intervals of said program signal; and said means for generating continuously recurring vertical interval code signals comprises a modulo counter selectably setable between a modulo-2 configuration and a modulo-5 configuration, said vertical interval code signal being a white flag placed in a designated line position of alternate vertical intervals under the control of said means for generating when said counter is selectably set to a modulo-2 configuration, said vertical interval code signal being a white flag placed in a designated line position of every first and third vertical intervals under control of said means for generating when said counter is selectably set to a modulo-5 configuration.

* * * * *